(12) United States Patent
Mohapatra et al.

(10) Patent No.: US 12,499,537 B2
(45) Date of Patent: Dec. 16, 2025

(54) SYSTEMS AND METHODS OF DEEP LEARNING FOR COLORECTAL POLYP SCREENING

(71) Applicant: University of South Florida, Tampa, FL (US)

(72) Inventors: Shyam S. Mohapatra, Lutz, FL (US); Subhra Mohapatra, Lutz, FL (US); Anmol Warman, Lutz, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 525 days.

(21) Appl. No.: 17/776,944

(22) PCT Filed: Nov. 13, 2020

(86) PCT No.: PCT/US2020/060532
§ 371 (c)(1),
(2) Date: May 13, 2022

(87) PCT Pub. No.: WO2021/097302
PCT Pub. Date: May 20, 2021

(65) Prior Publication Data
US 2022/0398458 A1    Dec. 15, 2022

Related U.S. Application Data

(60) Provisional application No. 62/934,739, filed on Nov. 13, 2019.

(51) Int. Cl.
*G06T 7/00* (2017.01)
*G06N 3/045* (2023.01)
(Continued)

(52) U.S. Cl.
CPC ......... *G06T 7/0012* (2013.01); *G06N 3/045* (2023.01); *G06N 3/08* (2013.01); *G06N 3/044* (2023.01);
(Continued)

(58) Field of Classification Search
CPC ......... G06T 7/0012; G06T 2207/10068; G06T 2207/20084; G06T 2207/30032;
(Continued)

(56) References Cited

U.S. PATENT DOCUMENTS 8,126,244 B2    2/2012    Barbu et al.
10,181,009 B2   1/2019    Yeatman et al.
(Continued)

FOREIGN PATENT DOCUMENTS

WO    2021097302 A1    5/2021

OTHER PUBLICATIONS

International Search Report of related application PCT/US2020/060532, mailed Feb. 5, 2021, 2 pages.
(Continued)

*Primary Examiner* — Md K Talukder
(74) *Attorney, Agent, or Firm* — HUSCH BLACKWELL LLP

(57) ABSTRACT

Disclosed are various embodiments of systems and methods of deep learning for colorectal polyp screening and providing a prediction of neoplasticity of a polyp. A video of a colonoscopy procedure can be captured. Frames from the video or images associated with the colonoscopy procedure can be extracted. A model for classifying objects that appear in the frames or the images can be obtained. A classification can be determined for a polyp that appears in at least one of the frames or images based on applying the frames or images to an input layer of the model.

10 Claims, 6 Drawing Sheets

(51) Int. Cl.
  *G06N 3/08* (2023.01)
  *G06N 3/044* (2023.01)
(52) U.S. Cl.
  CPC ............... *G06T 2207/10068* (2013.01); *G06T 2207/20084* (2013.01); *G06T 2207/30032* (2013.01)
(58) Field of Classification Search
  CPC .......... G06N 3/045; G06N 3/08; G06N 3/044; G06F 18/2137; G06F 18/2321; G06V 2201/032
  See application file for complete search history.

(56) References Cited

U.S. PATENT DOCUMENTS

| | | | |
|---|---|---|---|
| 10,304,193 | B1 | 5/2019 | Yu et al. |
| 2008/0281767 | A1* | 11/2008 | Garner .................... G06N 3/088 706/25 |
| 2010/0183210 | A1* | 7/2010 | Van Uitert ............ G06T 7/0012 382/131 |
| 2012/0327205 | A1 | 12/2012 | Takahashi |
| 2017/0218455 | A1* | 8/2017 | Steelman .............. C12Q 1/6886 |
| 2017/0285033 | A1* | 10/2017 | Blume ................... G16B 20/00 |
| 2018/0046755 | A1 | 2/2018 | Pe'Er et al. |
| 2018/0225820 | A1* | 8/2018 | Liang ...................... G06V 10/82 |
| 2018/0253839 | A1* | 9/2018 | Zur .................. A61B 1/000094 |
| 2018/0258498 | A1 | 9/2018 | Ahlquist et al. |
| 2018/0268298 | A1* | 9/2018 | Johansen ............... G06N 3/044 |
| 2022/0398458 | A1* | 12/2022 | Mohapatra ............ G06T 7/0012 |
| 2023/0260111 | A1* | 8/2023 | Rodrigues-Diaz .... G06T 7/0012 382/128 |

OTHER PUBLICATIONS

Written Opinion of related application PCT/US2020/060532, mailed Feb. 5, 2021, 7 pages.
Blanes-Vidal et al., "Addressing priority challenges in the detection and assessment of colorectal polyps from capsule endoscopy and colonoscopy in colorectal cancer screening using machine learning." Acta Oncologica 58.sup1 (2019): S29-S36.
Byrne et al., "Real-time differentiation of adenomatous and hyperplastic diminutive colorectal polyps during analysis of unaltered videos of standard colonoscopy using a deep learning model" Gut. Jan. 2019;68(1):94-100.
Chen et al., "Accurate Classification of Diminutive Colorectal Polyps Using Computer-Aided Analysis" Gastroenterology. Feb. 2018;154(3):568-575.
Danaee et al., "A deep learning approach for cancer detection and relevant gene identification." Pacific symposium on biocomputing 2017. 14 pages.
De Perio "Histopathological Cancer Detectionwith Deep Neural Networks" dated Apr. 20, 2019, retrieved Jan. 8, 2023, 23 pages, from Website URL: https://towardsdatascience.com/histopathological-cancer-detection-with-deep-neural-networks-3399be879671.
Gessert et al., "Deep transfer learning methods for colon cancer classification in confocal laser microscopy images." International journal of computer assisted radiology and surgery 14.11 (2019): 1837-1845. 13 pages.
Guo et al., "Automated polyp segmentation for colonoscopy images: A method based on convolutional neural networks and ensemble learning" Med Phys. Dec. 2019;46(12):5666-5676.
Ito et al., "Endoscopic Diagnostic Support System for cT1b Colorectal Cancer Using Deep Learning" Oncology. 2019;96(1):44-50.
Kainz et al., "Segmentation and classification of colon glands with deep convolutional neural networks and total variation regularization" PeerJ. Oct. 3, 2017;5:e3874. 28 pages.
Kather et al., "Predicting survival from colorectal cancer histology slides using deep learning: A retrospective multicenter study" PLoS Med. Jan. 24, 2019;16(1):e1002730. 22 pages.
Komeda et al., "Computer-Aided Diagnosis Based on Convolutional Neural Network System for Colorectal Polyp Classification: Preliminary Experience" Oncology. 2017;93 Suppl 1:30-34.
Mahmood et al., "Deep learning with cinematic rendering: fine-tuning deep neural networks using photorealistic medical images" Phys Med Biol. Sep. 13, 2018;63(18):185012. 17 pages.
Ribeiro et al., "Exploring Deep Learning and Transfer Learning for Colonic Polyp Classification" Comput Math Methods Med. 2016;2016:6584725. 16 pages.
Roth et al., "Improving Computer-Aided Detection Using Convolutional Neural Networks and Random View Aggregation" IEEE Trans Med Imaging. May 2016;35(5):1170-81. 35 pages.
Tajbakhsh et al., "Convolutional Neural Networks for Medical Image Analysis: Full Training or Fine Tuning?" IEEE Trans Med Imaging. May 2016;35(5):1299-1312. 17 pages.
Urban et al., "Deep Learning Localizes and Identifies Polyps in Real Time With 96% Accuracy in Screening Colonoscopy" Gastroenterology. Oct. 2018;155(4):1069-1078.e8.
Vinsard et al., "Quality assurance of computer-aided detection and diagnosis in colonoscopy" Gastrointest Endosc. Jul. 2019;90(1):55-63.
Wang et al., ""Development and validation of a deep-learning algorithm for the detection of polyps during colonoscopy"" Nat Biomed Eng. Oct. 2018;2(10):741-748.
Yao et al., "Automated Detection of Non-Informative Frames for Colonoscopy Through a Combination of Deep Learning and Feature Extraction" Annu Int Conf IEEE Eng Med Biol Soc. Jul. 2019;2019:2402-2406.
Yu et al., "Integrating Online and Offline Three-Dimensional Deep Learning for Automated Polyp Detection in Colonoscopy Videos" IEEE J Biomed Health Inform. Jan. 2017;21(1):65-75.
Zhang et al., "Automatic Detection and Classification of Colorectal Polyps by Transferring Low-Level CNN Features From Nonmedical Domain" IEEE J Biomed Health Inform. Jan. 2017;21(1):41-47.
Rex et al., "The American Society for Gastrointestinal Endoscopy PIVI (Preservation and Incorporation of Valuable Endoscopic Innovations) on real-time endoscopic assessment of the histology of diminutive colorectal polyps." Gastrointestinal endoscopy 73.3 (2011): 419-422.
Kessler et al., "A quantitative assessment of the risks and cost savings of forgoing histologic examination of diminutive polyps." Endoscopy (2011): 683-691.
Gupta et al., "Accuracy of in vivo optical diagnosis of colon polyp histology by narrow-band imaging in predicting colonoscopy surveillance intervals." Gastrointestinal endoscopy 75.3 (2012): 494-502.
Rasatogi et al., "Recognition of surface mucosal and vascular patterns of colon polyps by using narrow-band imaging: interobserver and intraobserver agreement and prediction of polyp histology." Gastrointestinal endoscopy 69.3 (2009): 716-722.
Rex et al., "Narrow-band imaging without optical magnification for histologic analysis of colorectal polyps." Gastroenterology 136.4 (2009): 1174-1181.
Ladabaum et al., "Real-time optical biopsy of colon polyps with narrow band imaging in community practice does not yet meet key thresholds for clinical decisions." Gastroenterology 144.1 (2013): 81-91.
Rastogi et al., "Impact of a computer-based teaching module on characterization of diminutive colon polyps by using narrow-band imaging by non-experts in academic and community practice: a video-based study." Gastrointestinal Endoscopy 79.3 (2014): 390-398.
Gross et al., "Computer-based classification of small colorectal polyps by using narrow-band imaging with optical magnification." Gastrointestinal endoscopy 74.6 (2011): 1354-1359.
Mori et al., "Impact of an automated system for endocytoscopic diagnosis of small colorectal lesions: an international web-based study." Endoscopy 48.12 (2016): 1110-1118.
Kominami et al., "Computer-aided diagnosis of colorectal polyp histology by using a real-time image recognition system and narrow-band imaging magnifying colonoscopy." Gastrointestinal endoscopy 83.3 (2016): 643-649.

(56) References Cited

OTHER PUBLICATIONS

Zachariah et al., "Prediction of polyp pathology using convolutional neural networks achieves 'resect and discard' thresholds." The American journal of gastroenterology 115.1 (2020): 138-44.
Yang et al., "Application of artificial intelligence in gastroenterology." World journal of gastroenterology 25.14 (2019): 1666-83.

* cited by examiner

SYSTEMS AND METHODS OF DEEP LEARNING FOR COLORECTAL POLYP SCREENING

CROSS-REFERENCE TO RELATED APPLICATIONS

This application is a national stage filing under 35 U.S.C. § 371 of International Application No. PCT/US2020/060532, filed Nov. 13, 2020, which claims priority to U.S. Provisional Application No. 62/934,739, filed on Nov. 13, 2019, all of which are herein incorporated by reference in full.

STATEMENT REGARDING FEDERALLY SPONSORED RESEARCH OR DEVELOPMENT

This invention was made with government support under IK6BX003778 and IK6BX004212 awarded by the United States Department of Veterans Affairs. The Government has certain rights in the invention.

BACKGROUND

Currently, colorectal cancer screening, while increasing in number, remain limited in translational success. One reason for this limitation is the inability to robustly and preemptively classify detected polyps. The current standard is unaided video colonoscopy, through White Light (WL) and Narrow Band Imaging (NBI), which can be subject to error, whether it be missing or misdiagnosing a lesion entirely.

SUMMARY

Disclosed herein are various systems and methods for colorectal polyp screening to address the aforementioned deficiencies. In various aspects, the present systems and methods include receiving, by a hardware processor, a dataset with images of polyps. Image-based features of the images can include a numerical feature. The hardware processor can convert clinical information into multiple categories and from a categorical format into a numerical format of the image-based features. The hardware processor can combine the converted clinical information with the image-based features. The combined converted clinical information and the image-based features can form a feature pool. The hardware processor can select an optimal feature subset from the feature pool. Selecting can include selecting image-based features and converted clinical information based on a training dataset for training a neural network. The hardware processor can create a classifier or a group of classifiers for the neural network using the selected optimal feature subset and the training dataset. The hardware processor can employ the classifier or the group of classifiers to provide a prediction of neoplasticity of a polyp.

According to another example, systems, computer-implemented methods, and a non-transitory computer-readable medium are provided. A computing device can capture a video of a colonoscopy procedure (or, in some cases, initiate capture of a video of a colonoscopy procedure). The computing device can extract frames from the video or images associated with the colonoscopy procedure. The computing device can generate or obtain a model for classifying objects that appear in the frames or images. In some aspects, the computing device can determine weights and biases for the model. The model can be a neural network that is based on a multilayer perceptron or deep neural network that utilizes forward and backward propagation for training. The computing device can determine a classification of a polyp that appears in at least one of the frames or images based at least in part on applying the frames or images to an input layer of the model. The classification of the polyp can include an adenoma polyp, a hyperplastic polyp, or a serrated polyp.

Other systems, methods, features, and advantages of the present disclosure for colorectal polyp screening will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
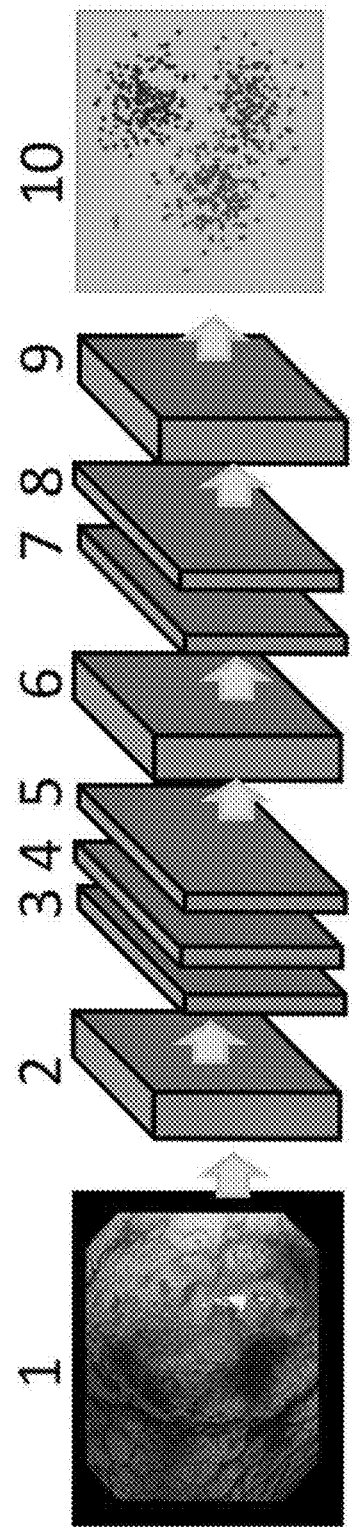
FIG. 1 illustrates a schematic of an example of deep learning in a computer vision-aided neural network analyses (CVNN) ($\pi$2E) platform, in accordance with various embodiments of the present disclosure.

Disclosed herein are various systems and methods for colorectal polyp screening. For example, a method of providing decision support in screening of colorectal polyps in a subject is disclosed. Various embodiments discussed herein can provide a prediction of neoplasticity of a polyp.

In the following detailed description, exemplary, or representative, embodiments disclosing specific details are set forth in order to provide a thorough understanding of inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art. It should also be understood that the word "example," as used herein, is intended to be non-exclusionary and non-limiting in nature.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a device" includes one device and plural devices. The terms "substantial" or "substantially" mean to within acceptable limits or degrees acceptable to those of skill in the art. For example, the term "substantially parallel to" means that a structure or device may not be made perfectly parallel to some other structure or device due to tolerances or imperfections in the process by which the structures or devices are made. Relative terms, such as "over," "above," "below," "top," "bottom," "upper" and "lower" may be used to describe the various elements' relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, would now be below that element.

Relative terms may be used to describe the various elements' relationships to one another, as illustrated in the accompanying drawings. These relative terms are intended to encompass different orientations of the device and/or elements in addition to the orientation depicted in the drawings.

The term "memory" or "memory device", as those terms are used herein, are intended to denote a non-transitory computer-readable storage medium that is capable of storing computer instructions, or computer code, for execution by one or more processors. References herein to "memory" or "memory device" should be interpreted as one or more memories or memory devices. The memory may, for example, be multiple memories within the same computer system. The memory may also be multiple memories distributed amongst multiple computer systems or computing devices.

A "processor," "hardware processor," "processing device," or "processing logic," as those terms are used herein encompass an electronic component that is able to execute a computer program or executable computer instructions. References herein to a system comprising "a processor," "a processing device," or processing logic should be interpreted as a system having one or more processors or processing cores. The processor may for instance be a multi-core processor. A processor may also refer to a collection of processors within a single computer system or distributed amongst multiple computer systems. The term "computer," as that term is used herein, should be interpreted as possibly referring to a single computer or computing device or to a collection or network of computers or computing devices, each comprising a processor or processors. Instructions of a computer program can be performed by a single computer or processor or by multiple processors that may be within the same computer or that may be distributed across multiple computers.

The disclosed systems and methods can provide decision support in screening of colorectal polyps in a subject, and for extracting features from a multi-slice data set derived from currently used White Light (WL) and Narrow Band Imaging (NBI). A system is devised that implements deep structured learning algorithm that can be trained on data that has been reduced or otherwise processed to extract noisy values. The system can also embed the data in two and three dimensions to observe the capacity of a proposed scheme to learn. The results of the anomaly removal and T-distributed Stochastic Neighbor Embedding (t-SNE) embedding can allow for a robust development of the neural network. For the observed data, the generated tools efficiently reduce their complexity and robustly classify lesions.

Cancer mortality statistics show that colorectal cancer (CRC) is the third most common cancer in men, the second most common in women and the second most common cause of cancer-related deaths in the USA with an estimated 5% lifetime risk. The American Cancer Society estimates there will be 140,250 new cases of CRCs in the United States in 2018, and CRC caused an estimated >50,630 deaths by the end of 2018. Worldwide, CRC has an estimated incidence of 1.2 million cases annually and accounts for 609,000 deaths. The five-year survival rate is 92% for Stage I CRC but falls sharply to 11% for Stage IV. combined with the lack of effective drugs without side effects for these patients suggests the need to develop technologies for effectively preventing CRCs in a faster and more economical manner. To this end, a major emphasis has been placed on colonoscopy screening to detect and remove neoplastic and serrated (recognized as a progenitor of 15% to 30% of all CRCs) polyps through polypectomy to prevent CRC. Pooled analysis of numerous large observational studies indicates that systematic removal of visualized polyps including adenomatous and serrated polyps at colonoscopy decreases proximal and distal CRC incidence and mortality by >60%. To date, polypectomy remains a life-saving and CRC-modifying intervention.

To this end, the time-honored standard colonoscopy has undergone enhancement to improve widefield detection of suspicious lesions (finding more polyps) while adding capabilities for accurate "real time histology" to enable selective removal. Currently, optical colonoscopy is regarded as the gold standard for detecting polyps and preventing CRC. Several modifications of optical colonoscopy led to either marginal improvement or have had mixed results. While effective, colonoscopy has not been fully protective due to several uncontrollable factors including missed polyps, operator factors, and inability to detect atypical, serrated polyps, and poorly-visualizable flat neoplasms. Tandem colonoscopy studies have suggested that as many as 15-27% of <5 mm, 12-13% of 6-9 mm, and 0.6-1.7% of >10 mm polyps can be missed at colonoscopy. Other factors adversely affecting efficacy include atypical adenoma-to-carcinoma progression and poorly-visualizable flat neoplasms. Thus, colonoscopy can benefit from assistive technologies that improve the neoplastic polyp detection rate as a primary performance benchmark.

Machine learning of polyps can provide new avenues to identify instantly whether a small polyp is neoplastic in situ. If endoscopists have the ability to reliably assess polyp histology endoscopically, resect-and-discard and/or leave-behind approaches to polyp management could be used. Though several endoscopic technologies have shown promise for the real-time assessment of polyp histology, narrow-band imaging (NBI) is the enhanced endoscopic imaging modality that has shown the most promise. The NBI International Colorectal Endoscopic (NICE) classification assess features from three polyp characteristics: color, vessels, and surface pattern. Thus, neoplastic polyp exhibits a dark, brown color vs background, with visible brown vessels surrounding white structures vs no vessels and with surface patterns of oval, tubular, or branched white structures surrounded by brown vessels vs dark or white spots of uniform size, or homogeneous absence of surface pattern. The major challenge in using NBI has been that the subjective nature of interpretation, inherent learning curve and inter-observer variability (e.g., academic experts being better than community docs) present are barriers to wider adoption.

To address these challenges, more recently the artificial intelligence (AI) enhanced endoscopy is under investigation. AI could provide in-situ real-time diagnostic guidance for the endoscopist as well as assist endoscopists in finding polyps, the procedure would be less rushed yet more efficient, and such a tool would facilitate more thorough surveillance of the mucosa, and may reduce the well-known quality problem of missed adenomas. The reduction in performing histopathology on non-neoplastic (i.e., of negligible malignant potential) polyps would result in added cost-saving to health care systems. A major attraction of this method is the potentially seamless integration with current endoscopic practice. Modern endoscopes inherently require computing power for image acquisition, processing, and display. Thus, integration of trained and validated AI algorithms could potentially be performed without additional external hardware (e.g., by configuring hardware as described herein). In addition, endoscopists are used to interfacing with endoscopes for switching between different illumination modes (e.g., switching between white light and narrow band imaging), magnification levels if available, and image/video acquisition for documentation of clinical findings. As such, it should feel natural for endoscopists to have a push-button option for capturing an image of a polyp and have instantaneous histology assessment or enable an AI assisted polyp detection mode and receive real-time feedback from the AI findings.

This disclosure presents a system to move past the obstacles that have hindered many tools and other classifying models. The disclosed system can reduce, or eliminate, the time or materials to obtain a colony from the polyp for lab testing, which has been shown to be a demanding task and have a low success rate. Further, the proposed system functions as a combination of easily accessible images that can be reduced to remove noisy data sets through another efficient computational model. The system first generated clean data and separated it by diagnosis method (WL or NBI). After dimensionality reduction and t-SNE mapping, the system generated a tool that was trained on 80% of the unstacked and processed data and tested on the remaining 20%. Patients in these sets represented a gradient of diagnoses ranging in terms of clarity and definitive convergence.

The results of the model predictions for these data sets were compared with the gathered results and displayed a high correlation (e.g., 0.9375 Pearson r value) which suggests that the model is a highly propitious system for the advancement of personalized care and cancer diagnosis. Given a larger test sample, it is expected that the error can be diluted and the correlation can increase to as much as a 0.9997 Pearson r value.

Materials and Methods

The disclosure includes a neural network that can be trained on open source images from colonoscopy videos, or other images that can be compressed into large matrices. For example, the matrices can contain 152 images with each parameter described as one of 698 columns. The data set can be further described by resulting diagnosis (Adenoma, Hyperplastic, and Serrated) in token form with assigned a value of 1, 2, or 3, etc. The data can consider the patient ID and the light ID to keep patient names confidential and distinguish between WL and NBI diagnosis methodologies.

As aforementioned the patients of the data can be characterized into 3 groups based on their diagnosis. These groups can describe patients as having Adenoma, Hyperplastic, or Serrated lesions. Because the network can be developed to match parameters to these diagnoses it can be important to unstack the data so that no other data alter the algorithm, for example a Light ID. In some examples, there were a total of 152 image readings and 76 images were read by WL and the other 76 by NBI. From this data set, two data sets were created with each describing one Light ID.

EXAMPLES

EXAMPLE 1: Anomaly Detection and Heatmap generation. This method of Predictive Artificial-Intelligence (PAI)-enhanced endoscopy (π2E) was developed while working with raw image/video data available (open source). It utilizes a unique computer vision-aided neural network analyses (CVNN) that provides a simple yet robust (>99% negative predictive value or NPV) computer-aided diagnosis (CAD) that provides high computational efficiency. The advantages of the newly designed CVNN include: i) a training algorithm that places balance of proper weights and a modified cost function, ii) data preprocessing using a mathematical data reduction technique that removes noise, iii) dimensionality reduction by t-SNE ensuring an optimal balance of data, layers, and weights, as schematically shown in FIG. 1.

As depicted in FIG. 1, the steps can include: 1) exploratory video and key frame extraction, 2-4) pre-processing: normalizing, unstacking and noise reduction, 5) dimensionality reduction, 6) multilayer perceptron, 7) train and test: 8) forward & back propagation, 9) weight & biases, and 10) outcome. Examples of raw data can include open source images from colonoscopy videos that had been compressed into large matrices containing 152 images (76 images were read by WL and the other 76 by NBI) with each parameter described as one of 698 columns. Additional details are described by Pablo Mesejo, et al., in "Computer-Aided Classification of Gastrointestinal Lesions in Regular Colonoscopy," IEEE Transactions on Medical Imaging, Institute of Electrical and Electronics Engineers, 2016, 35 (9), pp. 2051-2063. The data set was further described by resulting diagnosis (Adenoma, Hyperplastic, and Serrated) in token form, each assigned a value of 1, 2, or 3. Finally the data considered the patient ID and the light ID to keep patient names confidential and distinguish between WL and NBI diagnosis methodologies. Because the network sought to match parameters to these diagnoses, it was important to unstack the data so that no other data would alter the algorithm. This was namely the Light ID. The Light ID can be an identifier, a type, or other suitable data about a light used for colonoscopy procedure. From this single data set, two were created with each only describing one Light ID.

Given the noise of the raw data after unstacking, it can be important for computational reasons as well as applicability to reduce the unnecessary data. From the resultant anomaly removal, heat maps can be generated displaying a change from 698 parameters to only 466 parameters per each dataset.

Heatmaps can be generated by selecting $\chi_i$ features which are determined to be indicative of a normal distribution. From these features, parameters $\mu_1 \ldots \mu_m$ and $\sigma_i \ldots \sigma_m$ can be determined according to $$\mu_j = \frac{1}{m}\sum_{i=1}^{m} x_j^{(i)} \qquad (1)$$

$$\sigma_j^2 = \frac{1}{m}\sum_{i=1}^{m} ()x_j^{(i)} - u_j)^2, \qquad (2)$$

where m and $x_j^{(i)}$ can be defined as is or will be apparent to one with skill in the art upon examination of the drawings and detailed description herein.

Computing the Gaussian probability can allow the determination of anomalies to be possible. Anomalies can be defined as parameters or values that are too small to be relevant probabilistically as below.

$$p(x) = \prod_{j=1}^{n} p(x_j; u_j, \sigma_j^2) = \prod_{j=1}^{n} \frac{1}{\sqrt{2\pi}\sigma_j} \exp\left(-\frac{(x_j - \mu_j)^2}{2\sigma_j^2}\right) \qquad (3)$$

Figure 2:
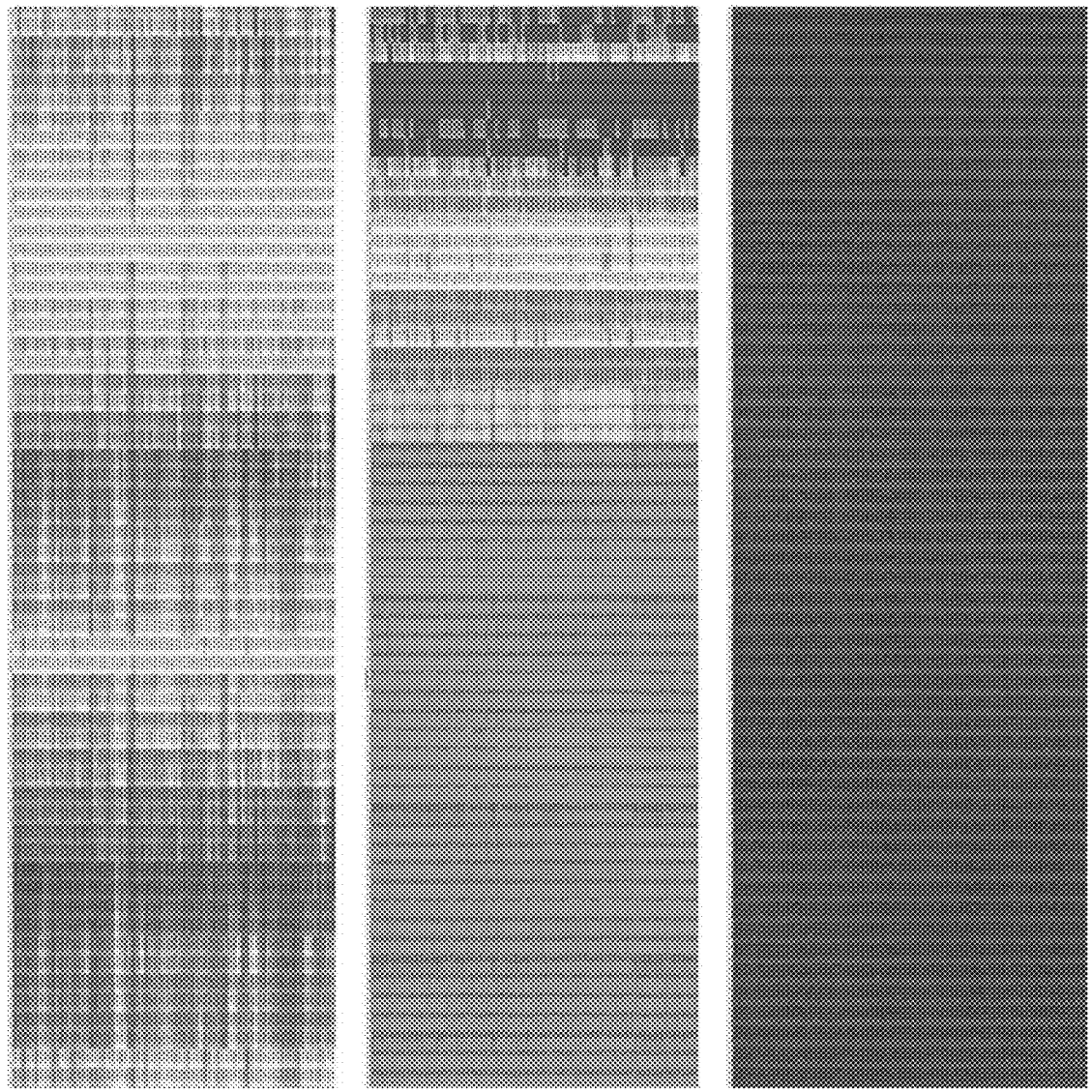
FIG. 2 illustrates examples of heat maps of various data parameters, in accordance with various embodiments of the present disclosure.

The heatmaps can be generated (e.g., after these anomalies are removed) to verify a gradient of values (FIG. 2). FIG. 2 depicts that there are three heat maps which show (from top to bottom): AHT Texture, (rotation-invariant (RI) local binary pattern (LBP) Texture, Naming Color, Discriminative Color), and 3D DNA Shape. The bottom heat map is representative of the raw data, and shows for example 152 images with each parameter described as one of 698 columns. The middle heat map depicts data that is representative of the raw data after it has been processed (or pre-processed), e.g., to reduce unnecessary data. The top heat map shows data after the resultant anomaly removal, displaying for example a change from 698 parameters to only 466 parameters per each dataset.

EXAMPLE 2: t-distributed Stochastic Neighbor Embedding. The goal was to be able to discern the relations between parameters of the now pre-processed data with regard to the 3 classes of separation. In some instances, the goal can be achieved without using classical techniques of Principal Component Analysis or Multidimensional Scaling. Simple classical techniques would have been implemented if the data had a linear correlation; however, given the non-linear relation an alternative method had to be developed. The prowess of the t-distributed stochastic neighbor embedding function allows for nonlinear n-dimensional data to be compiled into d-dimensional data.

The t-SNE protocol converts Euclidean distances into conditional probabilities, specifically the probability for a point $x_i$ to pick $x_j$ as its neighbor. This is given by $p_{j|i}$ defined below, where $\sigma^2$ serves to define the variance of the Gaussian centered at $x_i$.

$$p_{j|i} = \frac{\exp(-\|x_i - x_j\|^2)/2\sigma_i^2}{\sum_{k \neq i} \exp(-\|x_i - x_k\|^2)/2\sigma_i^2} \qquad (4)$$

A similar computation can be performed for the lower dimension counterparts of $x_i$ and $x_j$, $y_i$ and $y_j$, given by $q_{j|i}$.

$$q_{j|i} = \frac{\exp(-\|y_i - y_j\|^2)}{\sum_{k \neq i} \exp(-\|y_i - y_k\|^2)} \qquad (5)$$

In some examples, t-SNE can minimize the difference in conditional probabilities of $p_j/j_i$ and $q_j/j_i$. By making the difference zero, the points are conserved in the reduction of the dimensions. Using simple gradients, t-SNE also tries to minimize the sum of the conditional probabilities. By employing a heavy-tailed distribution in low-dimensional space, t-SNE can alleviate potential crowding and optimization problems.

t-SNE can also consider the variance i. Because there is no optimal value for the parameter, it can be assigned a distribution that changes its value based on the density of points in an area. This distribution has an entropy that increases as $\sigma_i$ increases and so a binary search for the value of $\sigma_i$ that produces a distribution, $P_i$ is performed. This perplexity is defined by $$\text{Per}(p_i) = 2^{H(P_i)}, \qquad (6)$$

where $H(P_i)$ is the Shannon entropy given by $$H(P_i) = -\sum_j p_{j|i} \log_2 p_{j|i} \qquad (7)$$

This perplexity is a smooth measure of the number of neighbors. Further, the cost of t-SNE can be minimized by gradient descent.

Dimensionality Reduction

Figure 3:
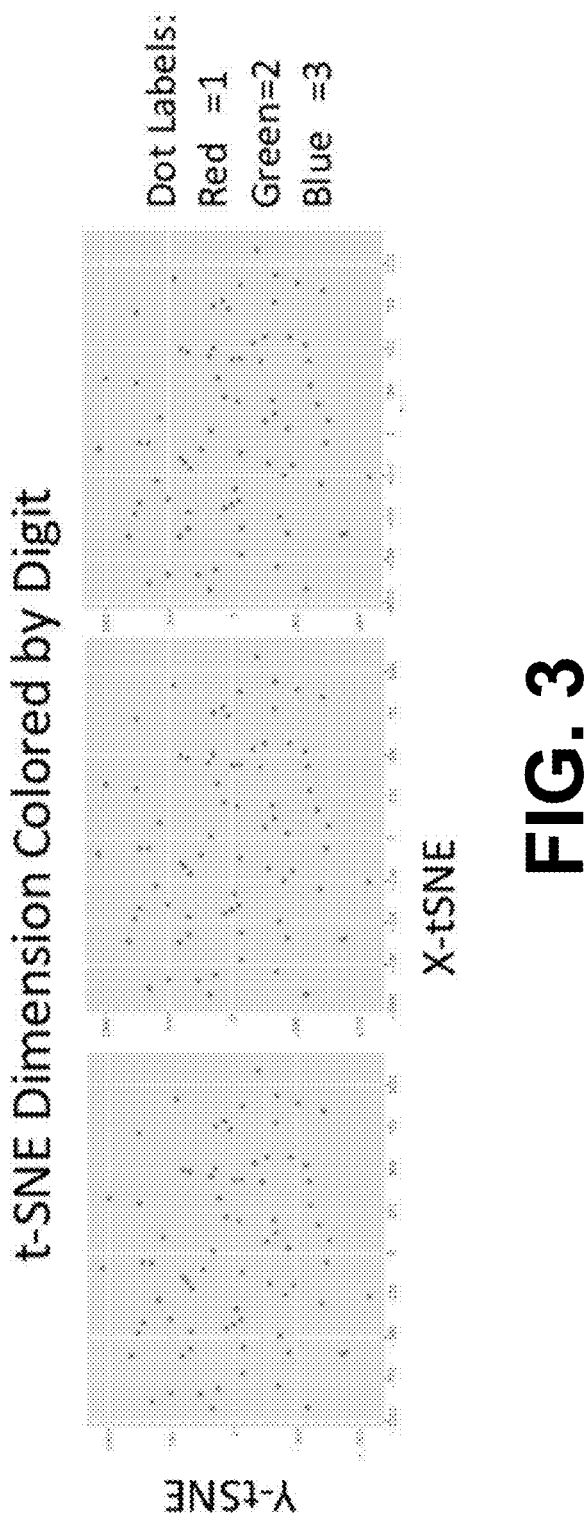
FIG. 3 illustrates an example of a 3-dimensional t-SNE result displayed in two dimensions, in accordance with various embodiments of the present disclosure.
Figure 4:
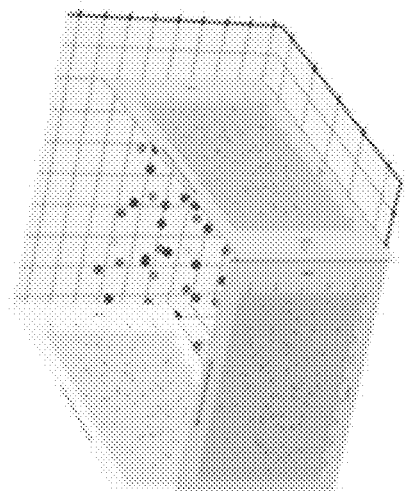
FIG. 4 illustrates an example of a 3-dimensional t-SNE result displayed in 3-dimensions as well as the overlaid imaging of the 2-dimension result, in accordance with various embodiments of the present disclosure.
Figure 4:
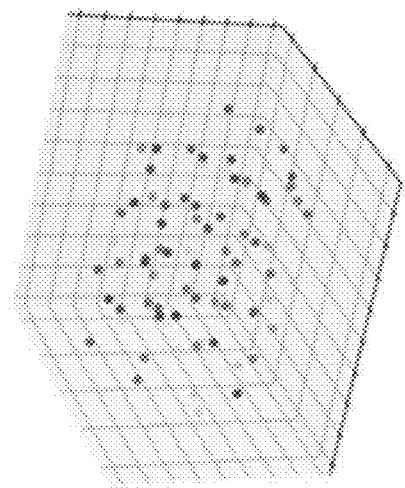

To determine how the data behaved when trying to cluster into three classes, the data was visualized in two and three dimensions that allowed for a visual understanding while observing the data transform gave more insight into the mechanics of classifying the data. Of course, the graph generated by the t-SNE function allows for analysis of the data as it becomes comprehensible in lower dimensions. By clustering the data together, it provides a more intuitive window into data exploration. The reduction of the dimensions are displayed in FIGS. 3 and 4. The 3-dimensional form of the data can be observed in two and three dimensions. FIG. 3 represents two dimensions. In FIG. 4, the individual colors represent a group with 1 being an Adenoma polyp, 2 being a Hyperplastic polyp, and 3 being a Serrated Lesions polyp. Further the two-dimensional mapping of the three-dimensional space was overlaid to give an insight into how the clustering was viewed. In FIG. 4, Red are Adenoma, Green are Hyperplastic, and Blue are Serrated Lesions.

Example 3: Multilayer Perceptron (MLP) and robust classification. In order to match the data parameters to the values of token diagnoses, 4-layer Multilayer Perceptron (MLP) Classifiers can be developed. The layers can have, e.g., 1000, 800, 600, and 500 neurons, or other suitable number of neurons, and implement a Heaviside step function for activation. Derivatives can be calculated in order to train and back propagate to the least error and overall cost to the network. The MLP can be trained on the 466 parameters of 80% of the 76 images then tested given the input of 466 parameters for the remaining 20%. The data point(s) can be scaled to allow the data to be processed efficiently while also maintaining high accuracy. A generated network can be considered if the cost is low, e.g., below $5 \times 10^{-8}$, and/or if accuracy surpasses a Pearson r of 0.9.

Figure 5:
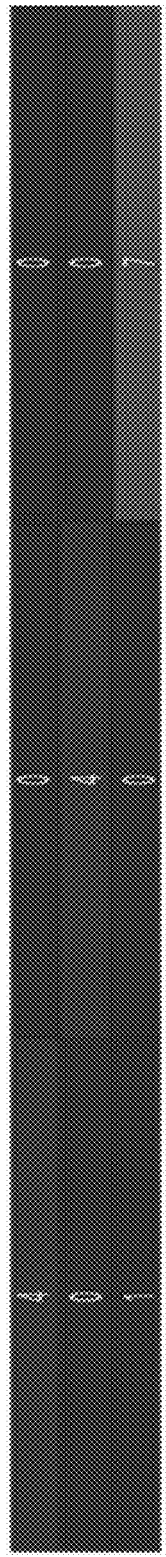
FIG. 5 illustrates an example of an NBI evaluated test samples confusion matrix, in accordance with various embodiments of the present disclosure.
Figure 6:
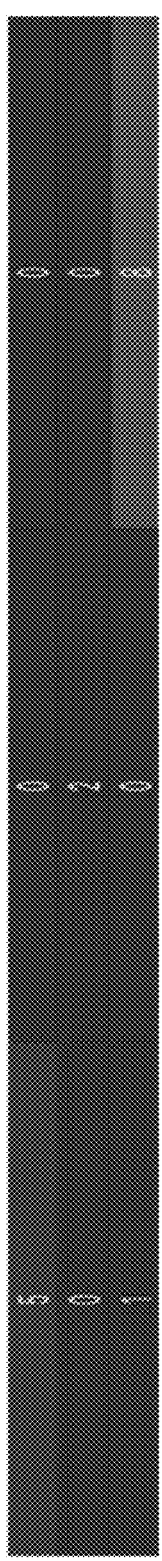
FIG. 6 illustrates an example of a WL evaluated test samples confusion matrix, in accordance with various embodiments of the present disclosure.

As observed in FIGS. 5 and 6, the model had a high linear correlation and accuracy (e.g., Pearson r value of 0.9375 for NBI and White Light) between the professional prediction and the experimentally tested response. FIG. 5 shows that 4/4 Adenoma samples and 4/4 Hyperplastic samples are identified correctly, and one error in the Serrated Lesion cohort. The Pearson r can be calculated to be 0.9375. FIG. 6 shows the 5/5 Adenoma samples and 3/3 Hyperplastic samples being identified correctly, and one error in the Serrated Lesion cohort. Pearson r can be calculated to be 0.9375. The confusion matrices are evaluated with the sum of the values on the diagonal being divided by the total amount of samples.

This poses a new development in the diagnosis of patients and in the medical field at large. By aiding doctors, this model can utilize an image to decrease the miss rate of dangerous lesions and help classify polyps.

The test sample was relatively small and proper given the size of the data used. Larger data samples may yield interesting results as the behavior of the model may show an increase in accuracy as single errors would be diluted. It may also be interesting to note that in both cases the only error was in the Serrated Lesion group and both times it was mistaken for an Adenoma Lesion. This could potentially be because of the similarities between the two and especially in some cases where even professionals may have a hard time distinguishing the lesions.

The simplicity and time efficiency of the model can have compounded effects throughout the oncology field. In addition to early identification of potential hardships of treatment, the model can complement existing models to identify other options for treatment. Not only does this improve the lifestyle of patients but also it does not subject them to cycles of a treatment that ultimately may not work.

CONCLUSIONS

The model presented represents a highly propitious elevation of current screening of polyps and diagnosis options. By developing a simple method of classifying tumor bodies, current options have been considerably improved. Current limitations of clinical acumen and previous experience can be expanded to bring patients a higher standard of care.

The method of using computer vision in image analysis also represents another step forward in personalized therapy. Previous attempts to classify gastrointestinal lesions often use computationally expensive parameters that require large amounts of effort to ascertain and analyze. By identifying a way to successfully extract relevant information from video colonoscopy, the method represents a less arduous process to diagnosing patients. The model's ability to identify highly the types of lesions and also to recognize disguised tissues and small masses also represents another development in the field of colonoscopy screening and tumor imaging.

The methodology itself represents a way to advance diagnosis of the state of polyps and malignancy of tumors. The methodology can be recreated to test gastrointestinal diseases and also various types of GI cancers. Ramifications in the way basic procedures are performed and in the way education can expand alongside this endeavor are also large. This can inform the process of screening and treating patients and also provide methods to provide a more robust and faster method to bring patients care that contemporary endeavors.

Figure 7:
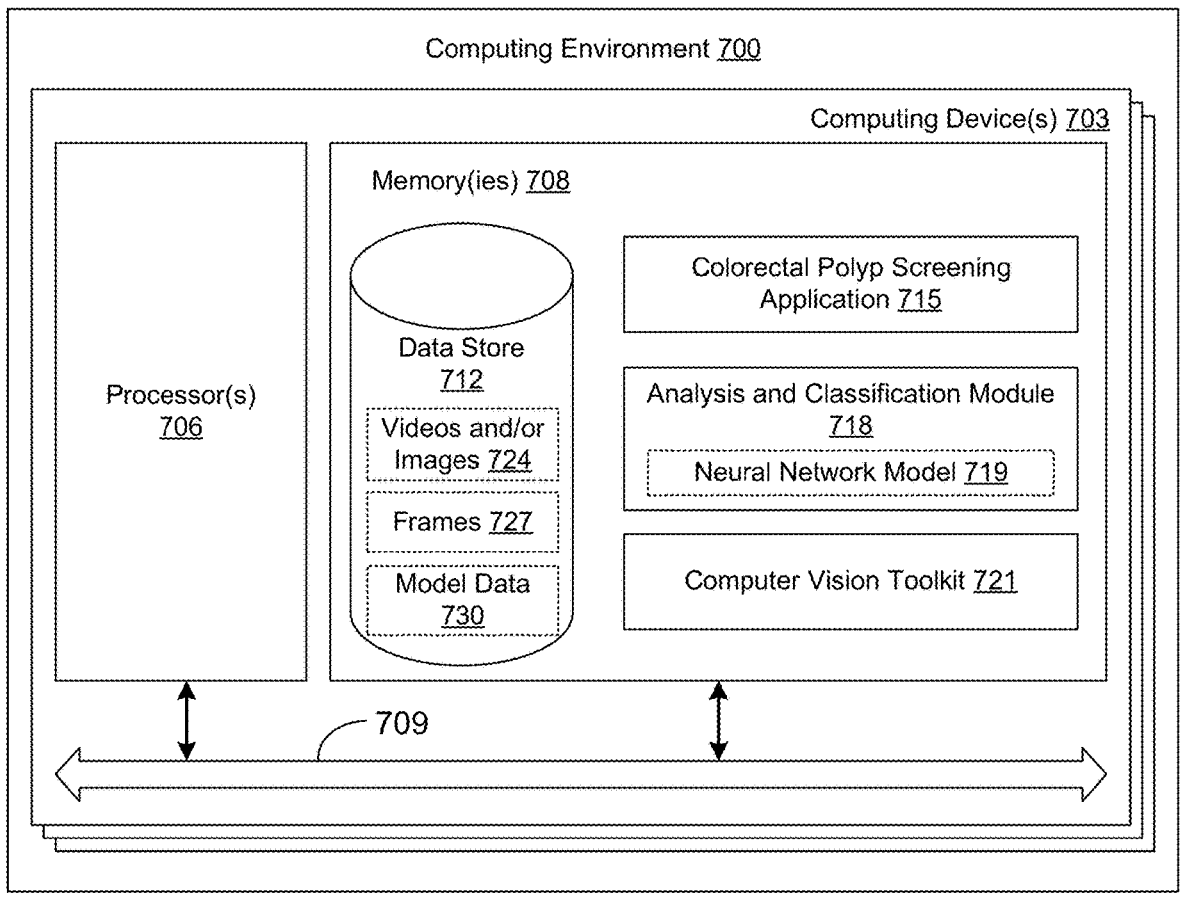
FIG. 7 is a schematic block diagram that provides one example illustration of a computing environment employed according to various embodiments of the present disclosure.

With reference to FIG. 7, shown is a schematic block diagram of the computing environment 700 according to an embodiment of the present disclosure. The computing environment 700 may comprise, for example, a server computer or any other system providing computing capability. Alternatively, the computing environment 700 may employ a plurality of computing devices that may be arranged, for example, in one or more server banks, computer banks, or other arrangements. Such computing devices may be located in a single installation or may be distributed among many different geographical locations. For example, the computing environment 700 may include a plurality of computing devices that together may comprise a hosted computing resource, a grid computing resource and/or any other distributed computing arrangement.

The computing environment 700 includes one or more computing devices 703. Each computing device 703 includes at least one processor circuit, for example, having a processor 706 and a memory 708, both of which are coupled to a local interface 709. To this end, each computing device 703 can comprise, for example, at least one server computer or like device. Examples of the computing device 703 can be embodied in the form of a desktop computer, a laptop computer, endoscopes, smartphones, tablet computer systems, or other devices with like capability. The local interface 709 can comprise, for example, a data bus with an accompanying address/control bus or other bus structure as can be appreciated.

The computing device 703 can include a display. The display can comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. The computing device 703 can also include one or more capture devices such as image cameras, video cameras, microphones, three-dimensional video capture devices, and other capture devices.

Various applications and/or other functionality may be executed in the computing environment 700 according to various embodiments. Stored in the memory 708 are both data and several components that are executable by the processor 706. In particular, stored in the memory 708 and executable by the processor 706 are the colorectal polyp screening application 715, the analysis and classification module 718, the computer vision toolkit 721, and other applications, services, processes, systems, engines, or functionality not discussed herein. Also stored in the memory 708 can be a data store 712 and other data. In addition, an operating system can be stored in the memory 708 and executable by the processor 706.

The data store 712 may be representative of a plurality of data stores 112 as can be appreciated. The data stored in the data store 712, for example, is associated with the operation of the various applications and/or functional entities described herein. The data stored in the data store 112 includes, for example, videos and/or images 724, frames 727, model data 730, and potentially other data.

It is understood that there may be other applications that are stored in the memory 708 and are executable by the processor 706 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 708 and are executable by the processor 706. In this respect, the term "executable" means a program file that is in a form that can ultimately be run by the processor 706. Examples of executable programs may be, for example, a compiled program that can be translated into machine code in a format that can be loaded into a random access portion of the memory 708 and run by the processor 706, source code that may be expressed in proper format such as object code that is capable of being loaded into a random access portion of the memory 708 and executed by the processor 706, or source code that may be interpreted by another executable program to generate instructions in a random access portion of the memory 708 to be executed by the processor 706, etc. An executable program may be stored in any portion or component of the memory 708 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 708 is defined herein as including both volatile and nonvolatile memory and data storage components. Volatile components are those that do not retain data values upon loss of power. Nonvolatile components are those that retain data upon a loss of power. Thus, the memory 708 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 706 may represent multiple processors 706 and/or multiple processor cores and the memory 708 may represent multiple memories 708 that operate in parallel processing circuits, respectively. In such a case, the local interface 709 may be an appropriate network that facilitates communication between any two of the multiple processors 706, between any processor 706 and any of the memories 708, or between any two of the memories 708, etc. The local interface 709 may comprise additional systems designed to coordinate this communication, including, for example, performing load balancing. The processor 706 may be of electrical or of some other available construction.

The colorectal polyp screening application 715 can be executed to provide decision support in screening of colorectal polyps in a subject. The analysis and classification module 718 can be executed to implement a neural network model 719 or deep structured learning algorithm that can be trained on data that has been reduced or otherwise processed to extract noisy values. The analysis and classification module 718 can also embed the data in two and three dimensions to observe the capacity of a proposed scheme to learn. The results of the anomaly removal and T-distributed Stochastic Neighbor Embedding (t-SNE) embedding can allow for a robust development of the neural network model 719. The computer vision toolkit 721 can be executed to allow the colorectal polyp screening application 715 and/or the analysis and classification module 718 to use computer vision in analysis, e.g., automatically perceiving, analyzing, understanding, and/or interpreting visual data.

Next, a general description of the operation of the various components of the computing environment 700 is provided. To begin, the colorectal polyp screening application 715 can obtain or receive the videos and/or images 724 comprising a dataset comprising a plurality of images of polyps. Image-based features of the videos and/or images 724 can include a numerical feature. In some aspects, the numerical feature can comprise or represent at least one of: a coefficient, a moment, a gray scale value, a derivative of an image intensity, or an image intensity. The image-based features can comprise a fractal dimension of a shape of the polyp, an intensity and a size of dark internal pixel clusters in the polyp, an intensity and a size of bright internal pixel clusters in the polyp, or one or more chain code measurements of the polyp.

The analysis and classification module 718 can convert clinical information into multiple categories and from a categorical format into a numerical format of the image-based features of the videos and/or images 724. The analysis and classification module 718 can combine the converted clinical information with the image-based features of the videos and/or images 724. The combined converted clinical information and the image-based features of the videos and/or images 724 can form a feature pool (e.g., of the model data 730).

The analysis and classification module 718 can select an optimal feature subset from the feature pool, the selecting comprising selecting image-based features and converted clinical information based at least in part on a training dataset, which can be stored as the model data 130 and/or associated with the neural network model 719. In some aspects, selecting the optimal feature subset can further comprise using at least one of a correlation filter, a recursive feature elimination, and a random feature selection. In some other aspects, selecting the optimal feature subset comprises executing a genetic algorithm-based feature selection for a plurality of iterations with a different randomly selected set of training data and testing data to obtain resulting plurality of feature subsets.

The analysis and classification module 718 can create, for the neural network model 719, a classifier or a group of classifiers using the selected optimal feature subset and the training dataset stored in the model data 730. In some aspects, the classifier or the group of classifiers is determined based at least in part by at least one calculation comprising: a simple mean value, a simple score, a weighted mean value, or a weighted score.

The colorectal polyp screening application 715 and/or the analysis and classification module 718 can employ the classifier or the group of classifiers to provide a prediction of neoplasticity of a polyp (e.g., a polyp associated with a subject, the videos and/or images 724, the frames 727, etc.). In some examples, the classifier or the group of classifiers is a linear discriminant analysis. The classifier or the group of classifiers can determine whether a polyp is malignant or benign, or determine a likelihood of malignancy of the polyp.

In other examples, the colorectal polyp screening application 715 can obtain or capture the videos and/or images 724 comprising a video of a colonoscopy procedure. The colorectal polyp screening application 715 can extract frames 727 from the video, or images of the videos and/or images 724 associated with the colonoscopy procedure.

The analysis and classification module 718 can generate, create, or obtain a neural network model 719 comprising a model for classifying objects that appear in the frames 727. Creating or obtaining the neural network model 719 can, for example, be based at least in part on the analysis and classification module 718 determining weights and biases for the neural network model 719. The neural network model 719 can be a neural network that is based at least in part on a multilayer perceptron or deep neural network that utilizes forward and backward propagation for training.

Examples of the neural network model 719 being the multilayer perceptron can comprise at least: the input layer, a first hidden layer, a second hidden layer, and an output layer.

Some examples of generating the neural network model 719 can include the analysis and classification module 718 generating pre-processed data based at least in part on at least one of normalizing, unstacking, or reducing noise associated with images from colonoscopy videos. The analysis and classification module 718 can generate, based at least in part on applying a nonlinear dimensionality reduction algorithm to the pre-processed data, embeddings of a plurality of image representations of polyps that appear in the images. Generating pre-processed data can include identifying each respective image as associated with a White Light (WL) diagnostic method or a Narrow Band Imaging (NBI) diagnostic method. The nonlinear dimensionality reduction algorithm can include T-distributed Stochastic Neighbor Embedding (t-SNE).

The colorectal polyp screening application 715 and/or the analysis and classification module 718 can determine a classification of at least one polyp that appears in at least one of the frames 727 based at least in part on applying the frames 727 to an input layer of the neural network model 719. The classification of the at least one polyp can comprise an adenoma polyp, a hyperplastic polyp, or a serrated polyp. The colorectal polyp screening application 715 can render, on a display of the computing device 703, a user interface. In various aspects, the user interface can comprise an indication associated with the classification of the at least one polyp. The indication can include an audio and/or visual signal, text, or other signal suitable for indicating the classification of the at least one polyp.

The colorectal polyp screening application 715, the analysis and classification module 718, the computer vision toolkit 721, and other applications, services, processes, systems, engines, or functionality not discussed herein can be executed by at least one computing device 703 that is embodied as an endoscope. The endoscope can have a button that, when selected, generates at least one command that can initiate capture of a video of a colonoscopy procedure. The command can cause the at least one computing device 703 to capture the video of the colonoscopy procedure, an image of a polyp, or other videos and/or images associated with the videos and/or images 724. The at least one command can further cause the at least one computing device 703 to provide instantaneous histology assessment or other functionality described herein. In some examples, the at least one command can cause the at least one computing device 703 to enable an AI assisted polyp detection mode and receive real-time feedback from the AI findings.

Although the colorectal polyp screening application 715, the colorectal polyp screening application 715, the analysis and classification module 718, the computer vision toolkit 721, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FP-GAs), or other components, etc. Such technologies are generally well known by those skilled in the art and, consequently, are not described in detail herein.

Also, any logic or application described herein, including the colorectal polyp screening application 715, the colorectal polyp screening application 715, the analysis and classification module 718, or the computer vision toolkit 721, that comprises software or code can be embodied in any non-transitory computer-readable medium for use by or in connection with an instruction execution system such as, for example, a processor 706 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein including the colorectal polyp screening application 715, the analysis and classification module 718, or the computer vision toolkit 721, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 703, or in multiple computing devices in the same computing environment 700. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. The term "about" can include traditional rounding according to significant figures of numerical values. In addition, the phrase "about 'x' to 'y'" includes "about 'x' to about 'y'".

Embodiments of the present disclosure can be described in view of the following clauses:

Clause 1. A method of providing decision support in screening of colorectal polyps in a subject, the method comprising: receiving, by a hardware processor, a dataset comprising a plurality of images of polyps, wherein image-based features of the images include a numerical feature; converting, by the hardware processor, clinical information into multiple categories and from a categorical format into a numerical format of the image-based features; combining, by the hardware processor, the converted clinical information with the image-based features, wherein the combined converted clinical information and the image-based features form a feature pool; selecting, by the hardware processor, an optimal feature subset from the feature pool, the selecting comprising selecting image-based features and converted clinical information based at least in part on a training dataset; creating, by the hardware processor, a classifier or a group of classifiers using the selected optimal feature subset and the training dataset; and employing, by the hardware processor, the classifier or the group of classifiers to provide a prediction of neoplasticity of a polyp.

Clause 2. The method according to clause 1, wherein the numerical feature represents at least one of: a coefficient, a moment, a gray scale value, a derivative of an image intensity, or an image intensity.

Clause 3. The method according to clause 1 or clause 2, wherein selecting the optimal feature subset further comprises using at least one of a correlation filter, a recursive feature elimination, and a random feature selection.

Clause 4. The method according to any of clauses 1-3, wherein selecting the optimal feature subset comprises executing a genetic algorithm-based feature selection for a plurality of iterations with a different randomly selected set of training data and testing data to obtain resulting plurality of feature subsets.

Clause 5. The method according to any of clauses 1-4, wherein the image-based features comprise a fractal dimension of a shape of the polyp, an intensity and a size of dark internal pixel clusters in the polyp, an intensity and a size of bright internal pixel clusters in the polyp, or a chain code measurement of the polyp.

Clause 6. The method according to any of clauses 1-5, wherein the classifier or one of the group of classifiers is a linear discriminant analysis.

Clause 7. The method according to any of clauses 1-6, wherein the classifier or the group of classifiers determines whether the polyp is malignant or benign.

Clause 8. The method according to any of clauses 1-7, wherein the classifier or the group of classifiers determines a likelihood of malignancy of the polyp.

Clause 9. The method according to any of clauses 1-8, wherein the classifier or the group of classifiers is determined based at least in part by at least one calculation comprising: a simple mean value, a simple score, a weighted mean value, or a weighted score.

Clause 10. A method for colorectal polyp screening, comprising: capturing, by a computing device, a video of a colonoscopy procedure; extracting, by the computing device, frames from the video or images associated with the colonoscopy procedure; obtaining, by the computing device, a model for classifying objects that appear in the frames or images; and determining, by the computing device, a classification of at least one polyp that appears in at least one of the frames or images based at least in part on applying the frames or images to an input layer of the model.

Clause 11. The method of clause 10, wherein the classification of the at least one polyp comprises an adenoma polyp, a hyperplastic polyp, or a serrated polyp.

Clause 12. The method of clause 10 or clause 11, wherein obtaining the model is based at least in part on determining weights and biases for the model.

Clause 13. The method of any of clauses 10-12, further comprising obtaining the model based at least in part on: generating pre-processed data based at least in part on at least one of normalizing, unstacking, or reducing noise associated with images from colonoscopy videos; and generating, based at least in part on applying a nonlinear dimensionality reduction algorithm to the pre-processed data, embeddings of a plurality of image representations of polyps that appear in the images.

Clause 14. The method of any of clauses 10-13, wherein the nonlinear dimensionality reduction algorithm comprises T-distributed Stochastic Neighbor Embedding (t-SNE).

Clause 15. The method of any of clauses 10-14, wherein generating pre-processed data comprises identifying each respective image as associated with a White Light (WL) diagnostic method or a Narrow Band Imaging (NBI) diagnostic method.

Clause 16. The method of any of clauses 10-15, wherein the model is a neural network that is a multilayer perceptron or deep neural network that utilizes forward and backward propagation for training.

Clause 17. The method of any of clauses 10-16, wherein the multilayer perceptron comprises at least: the input layer, a first hidden layer, a second hidden layer, and an output layer.

Clause 18. A system for colorectal polyp screening, comprising: at least one computing device; and program instructions executable in the at least one computing device that, when executed by the at least one computing device, cause the at least one computing device to: capture a video of a colonoscopy procedure; extract frames from the video or images associated with the colonoscopy procedure; obtain a model for classifying objects that appear in the frames or images; and determine a classification of at least one polyp that appears in at least one of the frames based at least in part on applying the frames or images to an input layer of the model.

Clause 19. The system of clause 18, wherein the classification comprises an adenoma polyp, a hyperplastic polyp, or a serrated polyp.

Clause 20. The system of clause 18 or clause 19, wherein the program instructions, when executed by the at least one computing device, cause the at least one computing device to: render, on a display of the at least one computing device, a user interface comprising an indication associated with the classification of the at least one polyp.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications Therefore, at least the following is claimed:

1. A method for colorectal polyp screening,:
capturing, by a computing device, a video of a colonoscopy procedure;
extracting, by the computing device, frames from the video or images associated with the colonoscopy procedure;
generating an initial set of numerical parameter values characteristic of the extracted frames or images;
generating a reduced set of numerical parameter values by applying at least one of normalizing, unstacking, or reducing noise associated with the extracted frames or images;
generating, based at least in part on applying a nonlinear dimensionality reduction algorithm to the reduced set of numerical parameter values, reduced dimensional embeddings of a plurality of image representations of polyps that appear in the images;
obtaining, by the computing device, a model for classifying polyps that appear in the frames or images; and
determining, by the computing device, a classification of at least one polyp that appears in at least one of the frames or images based at least in part on applying the reduced set of numerical parameter values to an input layer of the model.

2. The method of claim 1, wherein the classification of the at least one polyp comprises an adenoma polyp, a hyperplastic polyp, or a serrated polyp.

3. The method of claim 1, wherein obtaining the model is based at least in part on determining weights and biases for the model.

4. The method of claim 1, wherein the nonlinear dimensionality reduction algorithm comprises T-distributed Stochastic Neighbor Embedding (t-SNE).

5. The method of claim 1, wherein generating the initial set comprises identifying each respective image as associated with a White Light (WL) diagnostic method or a Narrow Band Imaging (NBI) diagnostic method.

6. The method of claim 1, wherein the model is a neural network that is a multilayer perceptron or deep neural network that utilizes forward and backward propagation for training.

7. The method of claim 6, wherein the multilayer perceptron comprises at least: the input layer, a first hidden layer, a second hidden layer, and an output layer.

8. A system for colorectal polyp screening, comprising:
at least one computing device; and
a non-transitory computer readable medium storing program instructions executable in the at least one computing device that, when executed by the at least one computing device, cause the at least one computing device to:
capture a video of a colonoscopy procedure;
extract frames from the video or images associated with the colonoscopy procedure;
generate an initial set of numerical parameter values characteristic of the extracted frames or images;
generate a reduced set of numerical parameter values by applying at least one of normalizing, unstacking, or reducing noise associated with the extracted frames or images;
generate, based at least in part on applying a nonlinear dimensionality reduction algorithm to the reduced set of numerical parameter values, reduced dimensional embeddings of a plurality of image representations of polyps that appear in the images;
obtain a model for classifying objects that appear in the frames or images; and
determine a classification of at least one polyp that appears in at least one of the frames based at least in part on applying the reduced set of numerical parameter values to an input layer of the model.

9. The system of claim 8, wherein the classification comprises an adenoma polyp, a hyperplastic polyp, or a serrated polyp.

10. The system of claim 8, wherein the program instructions, when executed by the at least one computing device, cause the at least one computing device to:
render, on a display of the at least one computing device, a user interface comprising an indication associated with the classification of the at least one polyp.

* * * * *